June 2, 1936. G. F. BAHR 2,043,206
BRAKE LEVER EXTENSION
Filed Aug. 1, 1935
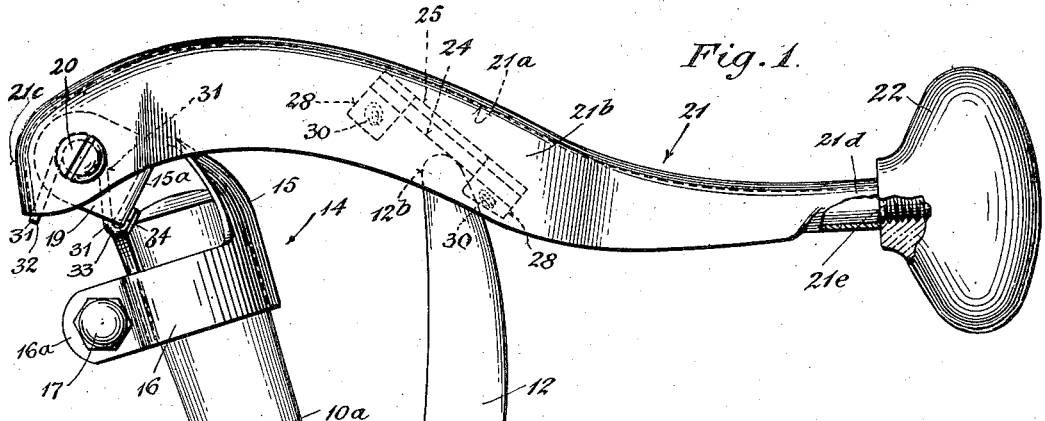
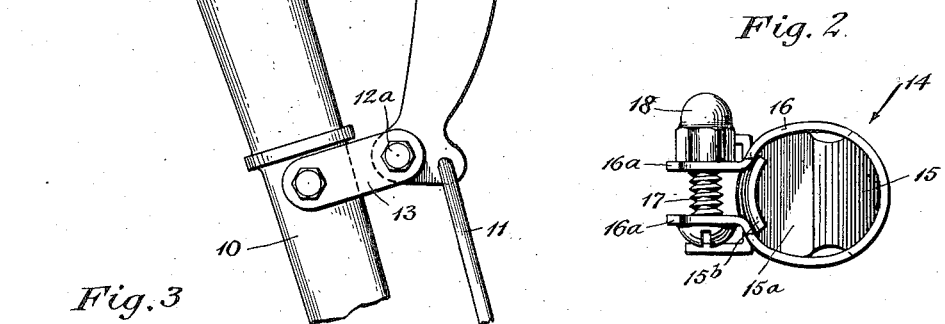
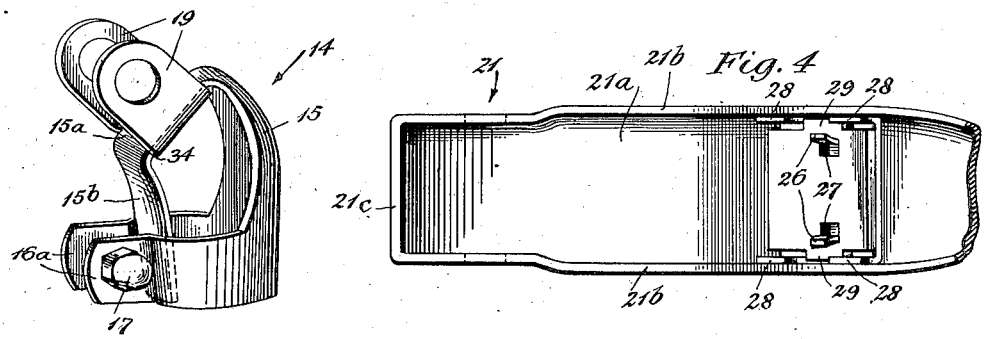
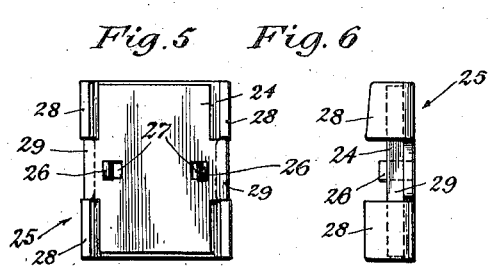
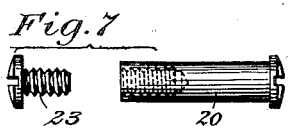

Patented June 2, 1936

2,043,206

UNITED STATES PATENT OFFICE 2,043,206

BRAKE LEVER EXTENSION

Gustave F. Bahr, Fairfield, Conn., assignor to Casco Products Corporation, Bridgeport, Conn., a corporation of Connecticut Application August 1, 1935, Serial No. 34,150

13 Claims. (Cl. 74—479)

This invention relates to extensions for emergency brake levers of motor vehicles by means of which the brake may be applied or released from the driver's seat without the necessity of the driver leaning forward, as he would be obliged to do, to reach the usual handle on the emergency or parking brake which is so placed as to be as far forward as possible so as not to interfere with the passage of persons in and out of front seats of vehicles.

An object of this invention is to provide a simple and efficient brake lever extension which may be easily applied to a large variety of brake levers, and which, when applied, firmly grips the brake lever, and to operate the same.

The brake lever extension of the present invention comprises an arm pivotally mounted on a clamping member secured to the brake lever handle and extending substantially horizontally toward the rear of the vehicle where its end is provided with a knob or suitable hand grip which may be grasped by the driver's hand in applying or releasing the brake.

According to the present invention, the extension lever is pivoted onto the clamping device for two reasons: (1) to permit the vertical adjustment of the operated end of the extension to a height desired, or, instead, by the position of the instrument board and other parts on the vehicle; and, (2) to permit the operator to pull upwardly and forwardly in the most natural manner when applying the brakes.

Further, according to the present invention, to release the brakes, it is merely necessary to press downwardly and forwardly on the extension handle and this will cause the latch release grip on the emergency brake handle to release the brake lever from locked position and permit it to return to off position.

An important feature of the present invention is the provision of an antifriction pad on the extension lever against which the top of the release grip strikes. This antifriction pad is preferably made of hard fibrous material and is also preferably coated or impregnated with oil, wax, paraffin, or other suitable form of lubricant so that the grip lever will ride smoothly and evenly against it and without undue wear.

A further feature of this invention is the provision of means for holding the extension against rattling which it would otherwise do since the operating pad merely lies against the top of the release grip in position to operate the same. For this purpose, there is provided between the mounting bracket and the extension lever a spring normally tending to depress the operated end of the lever and hold the pad against the release grip. The strength of the spring is such, of course, considering the angle at which the pad engages the release grip, that the extension lever will not operate the grip to release the latch but merely hold the pad firmly against the grip.

Another feature of the present invention is the improved form of mounting device for the brake lever extension. This device, according to the present invention, may be made of sheet metal, and has a main portion lying on the rear side of the emergency brake handle and extending upwardly over the handle and then downwardly on the other side of the handle and between lateral arms which embrace the handle and which are provided with draft means for drawing them tightly against the brake lever handle. When these arms are drawn together, they do not themselves grip against the handle to any substantial extent but they force the downwardly extending portion of the main body portion of the device and the rear portion of the device tightly against the brake lever handle.

Other features and advantages will hereinafter appear.

In the accompanying drawing, which illustrates one form of my invention, that at present preferred—

Figure 1 is a side view of the upper portion of the brake lever showing a handle, release grip and draw link, and the extension of the present invention applied to the handle and engaging the release grip.

Fig. 2 is a bottom plan view of the means whereby the extension lever is mounted on the brake lever handle.

Fig. 3 is a perspective view of the parts shown in Fig. 2.

Fig. 4 is a bottom plan view of the extension lever.

Fig. 5 is a plan view of the pad and mounting means therefor which engages the grip lever.

Fig. 6 is a side view of the same.

Fig. 7 shows the stud and screw by means of which the extension lever is mounted on the supporting device for rotary movement.

The accompanying drawing illustrates a conventional form of emergency brake lever 10 which is pivotally mounted in any suitable manner, the lower end of which operates a parking or emergency brake when the lever is pulled toward the rear of the vehicle. It is locked in set position by a ratchet segment and locking pawl which is connected by a link 11 to a hand grip 12 pivotally mounted at 12a on a bracket 13 carried by the lever 10. The hand grip extends parallel with the handle 10a on the lever, and when the parts 10a and 12 are squeezed together in the grip of the operator's hand the locking pawl is released and the brake lever may be moved from set to release position. Of course, the brakes may be applied by pulling the brake lever 10 toward the rear of the vehicle without releasing or even engaging the release grip 12.

For the convenience of the passengers in getting in and out of the vehicle, the brake lever should be located as far forwardly under the instrument panel as possible. This makes it difficult to reach for operation, and accordingly it has been proposed heretofore to employ an extension on the brake lever reaching rearwardly so that the operator may grasp the same and apply or release the brakes without leaning too far forwardly.

The present invention, as above stated, provides an improved form of brake lever extension and one which is economical to manufacture, easily applied, and sturdy and serviceable in use.

The brake lever extension of the present invention comprises a mounting member 14 having a main body portion 15 which rises vertically and has a downwardly and forwardly inclined portion 15a and a downwardly and rearwardly inclined portion 15b. Extending forwardly from the main body portion 15 are straps 16 terminating in ears 16a perforated to receive a screw 17 of a draft device which also includes a nut 18.

The body portion 15 is so formed that when the nut 18 is loosened, it may be applied over the top end of the brake handle 10a at which time the portion 15b will lie between the ends of the straps 16 and the front portion of the handle while the main body portion 15 and the sides of the straps may engage the rear and side surfaces of the handle. After the body portion 15 is applied to the top end of the handle and the nut 18 is tightened, the straps 16 are drawn together and against the sides of the handle.

At the same time, the main portion 15 is drawn tightly against the rear surface of the handle while the portion 15b is forced tightly against the front surface of the handle, and thus, in spite of slight irregularities in the form of the brake lever handle, the body portion 15 is tightly and securely fastened to it. The body portion 15 has a pair of forwardly and upwardly inclined ears 19 adapted to receive a stud 20, the under end of which has a threaded hole to receive a screw 23, and it is on this stud that the extension lever is mounted for rotary movement. The mounting member 14 is preferably and conveniently made of sheet metal stamped and formed to shape.

The extension lever 21 of the present invention is also preferably made of sheet metal stamped and formed to provide a top portion 21a and side walls 21b and a closed end 21c forming a channel or housing extending from the front end of the lever almost to the rear. Being of channel form, it is very strong and resists distortion in all directions and may be made of much lighter gauge material than would otherwise be possible.

The front end of the brake lever extension receives within it the ears 19 of the mounting member 14—the stud 20 and the screw 17 being applied after the ears are inserted between the side walls 21b of the extension lever. When so mounted on the mounting device, the extension lever lies at substantially right angles to the brake lever and its rear end is in position to be gripped by the operator without requiring the latter to lean too far forwardly. At the rear end, the material of which the brake lever is formed is bent around to form a substantially cylindrical socket 21d to receive and hold a stud 21e threaded or otherwise suitably secured in a knob or ball 22 forming a handle by means of which the extension lever is gripped.

It is obvious that by pulling rearwardly on the knob 22 the operator will pull the brake lever 10 to the rear, and that by reason of the pivotal mounting of the extension lever on the mounting device the movement of the knob 22 need not be about an arc having for its center the pivotal mounting of the brake lever 10.

The extension lever 21 has its side walls 21b so spaced that the upper end 12b of the grip lever will lie between these side walls, and, so far as some aspects of this invention are concerned, this end 12b of the hand grip 12 may be struck by the top portion 21a of the lever to be operated when the knob containing end of the extension lever is depressed. This would release the locking dog and allow the brake lever to return to released position.

However, to avoid undue wear and abrasion of the hand grip and extension lever upon each other, the present invention provides an antifriction pad 24, shown in detail in Figs. 5 and 6. This may and preferably is made of hard fibrous material, and to reduce the friction to a minimum it is preferably coated and impregnated with oil, wax, paraffin, or other lubricant. The pad 24 is carried by a sheet metal backing member 25 to which it is held by outwardly directed lugs 26 passing through apertures 27 in the pad 24. The backing plate 25 has lateral ears 28, two on each side, and between these the antifriction pad has lugs or tabs 29.

The backing plate is employed to back up the pad 24 and, in addition, to mount the same on the lever. For this purpose, it is so dimensioned that the ears 28 lie against the side walls 21b of the lever. When the pad is in the proper position, the ears 28 of the backing plate are spot-welded to the side walls, as indicated diagrammatically at 30.

The upwardly extending arched portion of the mounting member 14 is so high that the mounting device may be adjusted quite considerably vertically on the end of the handle 10a. This is done for the purpose of raising and lowering the position of the knob 22 with relation to the instrument board and other things which may be interfered with by the handle, or extension lever fulcruming on the upper end 12b of the hand grip 12 as a first class lever when the mounting member 15 is moved up and down on the end of the handle.

Since the extension lever has a mere contacting engagement with the upper end of the hand grip 12, as is most convenient considering the mounting of the device onto the brake lever, the extension lever would be liable to rise and fall during travel of the vehicle and produce a rattling noise. To avoid this, the present invention provides a spring 31 between the extension lever and the mounting member. This spring has several coils wrapped around the stud 20, and has one end 32 engaging the rear wall 21c of the extension lever and the other end 33 hooked around a portion 34 where one of the ears 19 joins with the portion 15a. The tendency of the spring is, therefore, to rotate the extension lever clockwise as viewed in Figs. 1 and 6, causing the pad 24 to be firmly pressed against the end 12b of the release grip. The pressure is heavy enough to prevent casual movement of the brake lever vertically from the position shown in Fig. 1, but is not sufficient to cause the hand grip 12 to be moved, for in that event the locking dog would be held released and the brakes could not be locked in set position.

Variations and modifications may be made within the scope of this invention and portions of the improvements may be used without others.

Having thus described the invention, what is claimed as new and for which it is desired to obtain Letters-Patent, is:—

1. An extension for vehicle brake levers having a handle and a brake release grip adjacent thereto, comprising an extension lever; means for mounting the extension lever on the said handle comprising a body portion having ears on which the extension lever is pivotally mounted, straps encircling the handle, means to draw the ends of the straps together to secure the body portion on the handle and a continuation of the body portion extending over the top of the handle and between the ends of the straps to be clamped to the handle by the straps; and means carried by the extension to engage and release the brake release grip when the extension lever is rocked downwardly.

2. The invention as defined in claim 1, in which the ears are formed integrally with the portion of the handle extending over the top of the handle.

3. The invention as defined in claim 1, in which the extension lever has downwardly extending side flanges, and in which the lever-carrying ears are located between and closely adjacent said flanges.

4. The invention as defined in claim 1, in which the extension lever has a longitudinally extending channel and into which the top end of the brake release grip extends to be confined by the walls of the channel.

5. The invention as defined in claim 1, in which the extension lever has a longitudinally extending channel and into which the top end of the brake release grip extends to be confined by the walls of the channel, and in which the means carried by the extension lever to engage and operate the release grip comprises an antifriction member transversely disposed in said channel.

6. An extension for vehicle brake levers having a handle and a brake release grip adjacent thereto, comprising an extension lever; flanges extending downwardly from said extension lever; means for mounting the extension lever on said handle for pivotal movement so that the end of the release grip lies between said flanges; and means comprising a plate of hard fibrous material mounted on said extension lever between said downwardly extending flanges for engaging said brake release grip to operate the same when the extension lever is rocked downwardly.

7. An extension for vehicle brake levers having a handle and a brake release grip adjacent thereto, comprising an extension lever; flanges extending downwardly from said extension lever; means for mounting the extension lever on said handle for pivotal movement so that the end of the release grip lies between said flanges; and means comprising a plate of hard fibrous material mounted on said extension lever between said downwardly extending flanges for engaging said brake release grip to operate the same when the extension lever is rocked downwardly, said plate being impregnated with antifriction substance.

8. An extension for vehicle brake levers having a handle and a brake release grip adjacent thereto, comprising an extension lever; flanges extending downwardly from said extension lever; means for mounting the extension lever on said handle for pivotal movement so that the end of the release grip lies between said flanges; and a plate of antifriction material carried by said extension lever between said downwardly extending flanges and adapted to engage the brake release grip to operate the same when the extension lever is rocked downwardly.

9. In combination, a vehicle brake lever having a handle; a brake release grip adjacent thereto; an extension lever; means for mounting the extension lever on said handle for pivotal movement; brake release means on the extension lever for moving said grip to effect brake release when said extension lever is rocked on the handle; and resilient means acting on the extension lever when the extension lever is in operable position with insufficient force to render the brake release means effective to move said grip to effect brake release but with sufficient force to maintain said brake release means in such firm engagement with said grip as to prevent rattling during vibrations or jouncing movements imparted to the extension lever.

10. In combination, a vehicle brake lever having a handle; a brake release grip adjacent thereto; an extension lever; means for mounting the extension lever on said handle for pivotal movement; brake release means on the extension lever for engaging the brake release grip when said extension lever is rocked downwardly; and resilient means for holding the extension lever in position whereby the brake release grip and the brake release means engage to hold these in firm engagement against vibrations or jouncing movements imparted to the extension lever, said means comprising a spring interposed between the extension lever and the means for mounting the same on the brake handle and tending to rock the extension lever downwardly, but with insufficient force to render said brake release means effective to move said grip to effect brake release.

11. The invention as defined in claim 1, having a spring interposed between the extension lever and the means for mounting the latter on the handle tending to rock the handle downwardly and holding the means which engages and releases the brake release grip in firm contact with the latter.

12. In combination, a vehicle brake lever having a handle; a movable brake release grip adjacent thereto; an extension lever; means separate from the handle and including a clamp encircling the handle for mounting the extension lever on said handle for pivotal movement; grip-moving means on the extension lever for moving said grip when said extension lever is swung in one direction on its pivot; and resilient means acting on the extension lever when the extension lever is in operable position with insufficient force to render said grip-moving means effective to move said grip but with sufficient force to maintain said grip-moving means in such firm engagement with said grip as to prevent rattling during vibrations or jouncing movements imparted to the extension lever.

13. The invention as defined in claim 9, wherein said resilient means comprises a spring acting with insufficient force to render said brake release means effective to move said grip to effect brake release, said spring being associated solely with said extension lever and its mounting means, said mounting means being wholly carried by said extension lever.

GUSTAVE F. BAHR.